United States Patent

Kubouchi et al.

Patent Number: 5,516,124
Date of Patent: May 14, 1996

[54] METAL GASKET

[75] Inventors: Kenji Kubouchi; Kunitoshi Inoue, both of Osaka, Japan

[73] Assignee: Nippon Gasket Co., Ltd., Osaka, Japan

[21] Appl. No.: 83,435

[22] Filed: Jun. 29, 1993

[30] Foreign Application Priority Data

Jun. 30, 1992 [JP] Japan .................. 4-194651

[51] Int. Cl.⁶ ...................................... F16J 15/08
[52] U.S. Cl. ........................ 277/235 B; 277/207 R; 277/236
[58] Field of Search .............. 277/235 B, 236, 277/207 R, 210, 213

[56] References Cited

U.S. PATENT DOCUMENTS

| | | |
|---|---|---|
| 4,767,124 | 8/1988 | Udagawa ............... 277/235 B |
| 4,815,750 | 3/1989 | Yoshino . | |
| 5,170,927 | 12/1992 | Udagawa et al. ........... 277/235 B |

FOREIGN PATENT DOCUMENTS

| | | |
|---|---|---|
| 0493953 | 12/1991 | European Pat. Off. . |
| 0528698 | 8/1992 | European Pat. Off. . |
| 210465 | 9/1988 | Japan . |
| 18678 | 3/1989 | Japan . |
| 4248070 | 9/1992 | Japan ................ 277/235 B |

*Primary Examiner*—Daniel G. DePumpo
*Attorney, Agent, or Firm*—Browdy and Neimark

[57] ABSTRACT

A metal gasket comprising an elastic metal plate including beads formed around cylinder bore holes of a multiple-cylinder engine, wherein each bead comprises an independent bead formed around each hole, a common bead between an adjacent pair of holes and junction beads connecting the independent bead and the common bead. The metal gasket controls a spring constant at the junction beads to a suitable value by specifying the shape of the junction beads, reduces a peak value of a face-to-face pressure at the junction beads and makes uniform the face-to-face pressure in the vicinity of the junction beads.

3 Claims, 6 Drawing Sheets

5,516,124

METAL GASKET

BACKGROUND OF THE INVENTION

1. Field of the Invention

This invention relates to a metal gasket used for sealing a portion between a cylinder head and a cylinder block of a multiple-cylinder engine.

2. Description of the Prior Art

In a multiple-cylinder engine, a cylinder head and a cylinder block are coupled with each other by bolts, and a metal gasket is sandwiched between the cylinder head and the cylinder block to prevent leak of a gas from their fitting surfaces. A metal gasket includes cylinder bore holes 2 bored in an elastic metal plate 1 and a bead 3 formed around the periphery of each hole 2 as shown in FIG. 1. In this metal gasket, the beads 3 define the seal portion on the fitting surfaces by the clamping force of the bolts, and exhibit an effective seal function.

Recently, a metal gasket has been developed wherein the respective beads 3 join with one another at a junction 4 between two adjacent holes 2 in such a manner as to define a common bead 5 between the holes 2 (e.g. U.S. Pat. No. 4,815,750 (corresponding to Japanese Patent Laid-Open No. 210465/1988) and Japanese Utility Model Publication No. 86878/1989). Such a metal gasket will be explained with reference to FIGS. 10 and 11. In the drawings which will appear, like reference numerals will be used to identify like constituents of the metal gasket. FIG. 10 is an enlarged explanatory view showing an example of the junction in a conventional metal gasket.

In FIG. 10, each of the two beads 3 is shaped into an arc along the hole 2 at the common bead 5 between the holes 2. A two-dot-chain line represents the center line 6 of the bead, and the center lines 6 of the two beads 3 are in contact with each other at the center of the common bead 5 between the junctions 4. Since the beads 3 have such a shape, the bead width $L_1$, $L_2$ of the non-junction ($L_1=L_2$) is substantially equal to the bead width $L_3$ at the center of the common bead 5. In contrast, the bead width $L_4$ at the junction 4 at which the beads 3 join with each other is about twice the bead width $L_1$, $L_2$ of the non-junction and the bead width $L_3$ at the common bead 5.

As a result, as can be understood from a face-to-face pressure (kgf/mm$^2$) of the bead shown in the graph of FIG. 10 (a linear pressure (kgf/mm) in terms of an analytical value by a finite-element method), the face-to-face pressure drops drastically in the vicinity of a portion at which the bead width greatly changes, that is, near the junction position (regions X and Y encompassed by circles). However, the face-to-face pressure is the reaction that occurs in the beads formed along the holes of the metal gasket when the metal gasket is fitted under the compressed state between the cylinder head and the cylinder block. The drop of the face-to-face pressure is particularly remarkable at the portion (region X) near the center of the common bead 5. This drop of the face-to-face pressure is believed to result from a small spring constant at the junction 4. In other words, since the ratio of the bead width with respect to the bead height becomes drastically great at the junction position in comparison with the non-junction position, the spring constant becomes small at the junction 4 and for this reason, it is believed that the drop of the face-to-face pressure in the vicinity of the junction occurs. As the drop of the face-to-face pressure is remarkable at the junction 4 in the metal gasket shown in FIG. 10 as described above, sufficient seal performance cannot be secured because the face-to-face pressure of the bead affects seal performance.

FIG. 11 is an enlarged explanatory view showing another example of the junction of the conventional metal gasket. The metal gasket shown in FIG. 11 is of an improved type of the metal gasket shown in FIG. 10. In this metal gasket, the beads 3 are formed on the elastic metal plate 1 to perform the sealing function. The holes 2 are bored in the elastic metal plate 1, the bead 3 is so formed as to encompass each hole 2, and the beads 3 join with one another between the adjacent holes 2 and have a linear portion 7 at the center of the common bead 5. In this metal gasket, the bead width of the non-junctions is made progressively smaller towards the junction 4 so that the bead width of the junction 4 of the beads 3 for sealing of each seal portion provided to the elastic metal plate 1 becomes substantially equal to the bead width of the non-junction. In other words, the bead width $L_4$ of the junction 4 is so shaped as to be substantially equal to the bead width $L_1$, $L_2$ ($L_1=L_2$) of the non-junction, and the bead width $L_4$ of the junction 4 and the bead width $L_1$, $L_2$ of the non-junction are shaped into the same size so as to increase the spring constant at the junction 4, to avoid the problem of the drop of the seal pressure of the junction 4 and to prevent the face-to-face pressure from becoming non-uniform. As shown in the drawing, this metal gasket certainly has a large spring constant at the junction 4 and the face-to-face pressure does not drop when only the junction 4 is taken into consideration.

Nonetheless, according to analytical calculation by the finite-element method, the drop of the face-to-face pressure $P_L$ of this metal gasket is remarkably great at the boundary between the junction 4 and the non-junction as shown in FIG. 11 and is about ½ of the face-to-face pressure $P_M$ of the non-junction. Further, since the spring constant of the junction 4 is increased, the face-to-face pressure $P_{MAX}$ of the junction 4 scores an extremely high value, and non-uniformily of the face-to-face pressure is induced, conversely. Since this metal gasket has an unbalanced face-to-face pressure state as described above, its seal performance is not reasonably high, and if the spring constant and the face-to-face pressure are increased, undesirable problems with durability such as buckling and cracks will occur.

Therefore, the shape of the beads of the metal gasket shown in FIG. 11 will be examined. Although the bead width $L_4$ of the junction 4 is the same as the bead width $L_1$, $L_2$ of the non-junction, two center lines 6 of the bead exist in the junction 4 as represented by a two-dot-chain line. Needless to say, the height of the bead 3 does not vary between the junction 4 and the non-junction. Therefore, the sectional shape of the beads 3 at the junction 4 describes two sharp humps in such a way that the bead width of the non-junction decreases progressively towards the junction 4. Since the bead itself is originally very thin and moreover, since the bead width is contracted at the junction 4, the sectional shape of the bead 3 changes complicatedly and drastically at the junction 4. For this reason, the face-to-face pressure becomes extremely great at such a junction 4 and as a reaction, the face-to-face pressure drops drastically on both sides of the junction 4. Moreover, machining of the junction 4 becomes extremely difficult. Among others, a mold for producing the bead 3 having such a sectional shape which changes in a complicated way is extremely difficult to produce, and practical machining is almost impossible because the production cost is very high.

SUMMARY OF THE INVENTION

It is an object of the present invention to provide an economical and high reliability metal gasket which includes beads formed around cylinder bore holes bored in an elastic metal plate in such a way as not to contract a bead width at junction beads and to minimize the change of a sectional shape of the beads but to permit a smooth change, which brings a spring constant of the junction close to a spring constant of a non-junction comprising a common bead and an independent bead, which minimizes a peak value of a face-to-face pressure at the junction as well as the drop of a face-to-face pressure occurring at the boundary between the junctions and the non-junction, thus makes uniform the face-to-face pressure in the vicinity of the junction, secures durability and prevents the occurrence of buckling and cracks.

It is another object of the present invention to provide a metal gasket which includes beads for sealing, formed around cylinder bore holes bored in an elastic metal plate in such a way that one of the surfaces thereof is convex and the other is concave, each of the beads comprising an independent bead in regions other than a region between the cylinder bore holes, one common bead between the bore holes and junction beads at which the independent bead and another adjacent independent bead join with each other, wherein the independent bead is formed between an inner border and an outer border extending around the hole, the common bead is formed between the inner borders extending linearly in proximity to the holes adjacent to one another and is shaped into a straight shape having substantially the same bead width, and each of the junction beads is formed by a junction portion encompassed by an outer arcuate border to which the outer border of the independent bead and the outer border of the adjacent independent bead connect with a smooth curve, and arcuate borders on both sides to which the inner border of the independent border and the inner border of the common bead connect with an arc having a radius of curvature smaller than that of the hole.

In the metal gasket described above, a face-to-face pressure regulation recess is formed at the center of the junction portion of the junction beads so as to control the face-to-face pressure of the beads. Therefore, since the spring constant at the junction beads can be set to a suitable constant by the size of the face-to-face pressure regulation recess, a load stress of the beads at the junction beads is prevented from becoming excessively great, neither buckling nor cracks occur from the junction beads, and durability can be improved.

In this metal gasket, the peak value of the spring constant of the junction beads is reduced and is brought close to the spring constant of the common bead, and the drop of the spring constant on both sides of the junction beads is restricted and is brought close to the spring constants of the independent bead and the common bead.

In the metal gasket, the peak value of the face-to-face pressure of the junction beads is reduced and is brought close to the face-to-face pressure of the common bead, and the drop of the face-to-face pressure of the regions on both sides of the junction beads is restricted and is brought close to the face-to-face pressures of the independent bead and the common bead.

In this metal gasket, the common bead and the independent bead are connected in the region of the junction beads by a smooth curve with a radius of curvature smaller than that of the independent bead. Therefore, the portion having a large bead width can be made smaller than in the conventional metal gasket shown in FIG. 10, the spring constant of the junction beads can be made greater than in the metal gasket shown in FIG. 10, and the drop of the face-to-face pressure is not so much great as in the metal gasket shown in FIG. 10. Further, in this metal gasket, the spring constant is smaller than in the metal gasket shown in FIG. 11 and the peak value of the face-to-face pressure at the junction beads can be restricted to a lower value. At the same time, the drop of the face-to-face pressure occurring at the boundary between the junction beads, the independent bead and the common bead can be minimized, and the face-to-face pressure in the vicinity of the junction beads can be made uniform.

In this metal gasket, the triangular portion $\Delta$ encompassed by the center lines of the three beads is formed in the region of the junction beads and the length of the perpendiculars from these center lines to the boundary of the beads is substantially the same. Therefore, the portion having a large ratio of the bead width to the bead height is smaller than in the metal gasket shown in FIG. 10, so that the spring constant at the junction portions is greater than in the metal gasket shown in FIG. 10. In other words, the drop of the face-to-face pressure in this metal gasket is not much greater than in the metal gasket shown in FIG. 10. Since the metal gasket is shaped in such a way that the length of the perpendicular drawn from the center lines of the beads to the boundary of the beads becomes substantially constant, the change of the bead width of the beads at the junction beads is small and the sectional shapes of the beads do not much change. Accordingly, the spring constant becomes smaller in this metal gasket than in the metal gasket shown in FIG. 11, and the peak value of the face-to-face value becomes smaller. Because the peak value of the face-to-face pressure at the junction beads can be limited to a considerably small value in this way and at the same time, because the drop of the face-to-face pressure at the borders on both sides of the junction beads can be limited likewise to a lower value, the face-to-face pressure in the vicinity of the junction beads can be made uniform.

Moreover, since this metal gasket has the bead shapes such that the change of the bead width is small and the sectional shapes of the beads do not much change, the beads need not be contracted at the junction beads unlike the conventional metal gasket, the production of the mold becomes easy and simple, and the production cost can be reduced.

Since the drop of the face-to-face pressure occurring at the junction beads and on both sides of the junction beads can be restricted to a considerably low level in this metal gasket, the face-to-face pressure on both sides of the junction beads can be secured and the face-to-face pressure at the junction beads does not reach an unnecessary high level. Accordingly, the face-to-face pressure in the vicinity of the junction beads can be made uniform, and stable seal performance can be secured.

DESCRIPTION OF THE PREFERRED EMBODIMENTS

Figure 1:
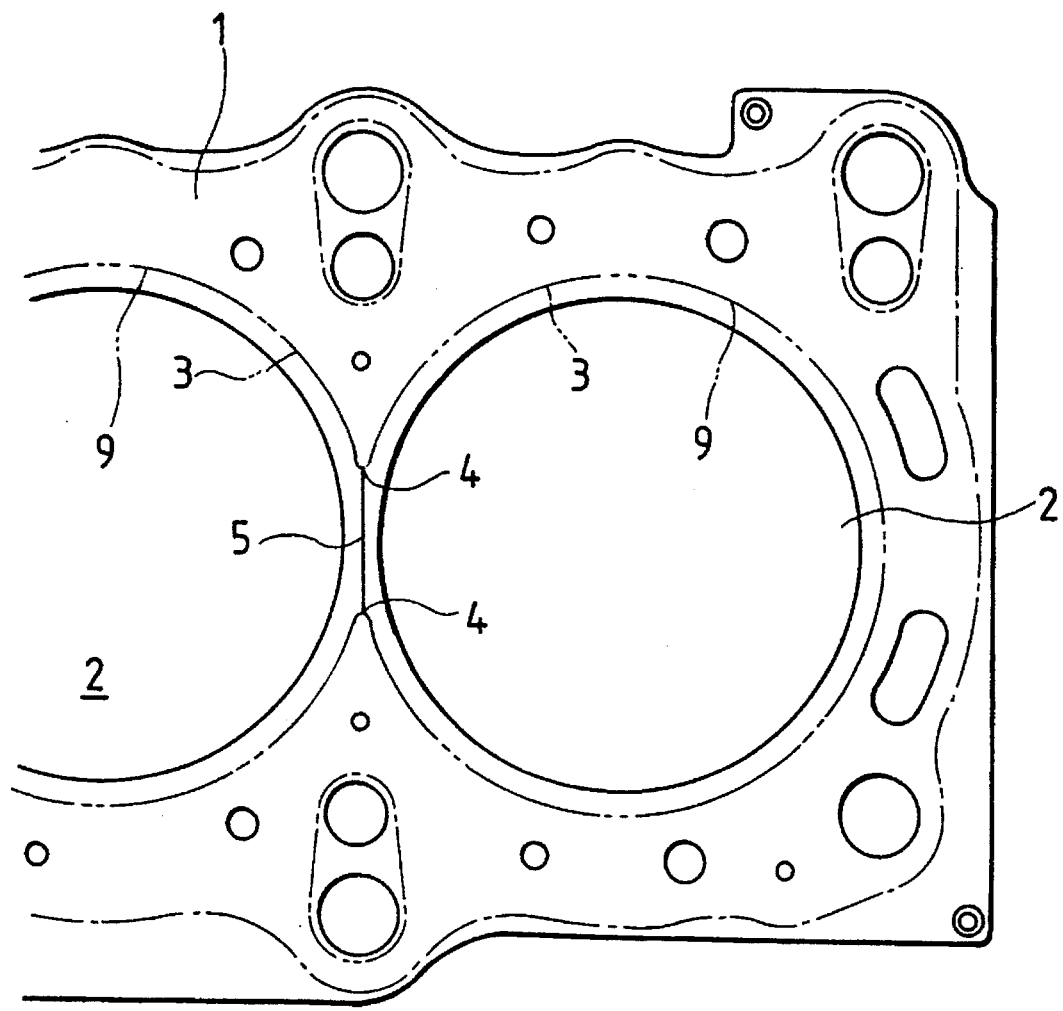
FIG. 1 is a schematic plan view showing a metal gasket according to an embodiment of the present invention.

Hereinafter, some preferred embodiments of the metal gasket according to the present invention will be explained with reference to the drawings. FIG. 1 is a plan view showing a part of the metal gasket according to the present invention. This metal gasket includes a large number of holes such as cylinder bore holes 2 (hereinafter referred to as the "holes 2"), bolt holes, etc, that are bored in an elastic metal plate 1. A bead 3 is formed around each hole 2. A two-dot-chain line represents a center line 6 of the bead 3. The metal gasket is sandwiched between a cylinder head and a cylinder block and is fastened by fastening bolts. In this instance, the bead 3 undergoes elastic deformation, forms a seal portion between the fitting surfaces, and prevents leak of a gas, an oil, and so forth.

Figure 2:
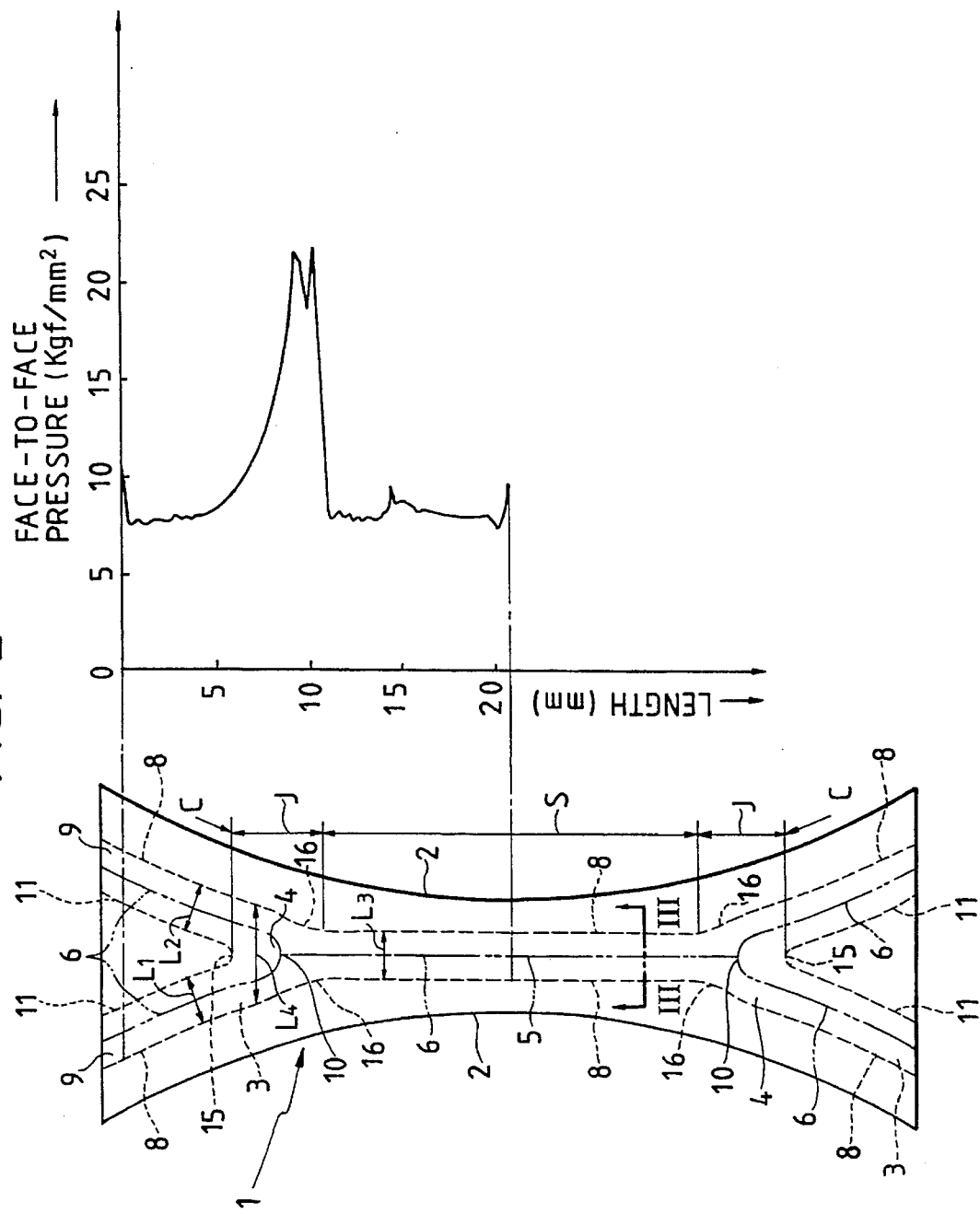
FIG. 2 is an enlarged explanatory view showing an example of a bead between bore holes of this metal gasket.

FIG. 2 is an enlarged explanatory view of an example of a portion between the holes 2 of the metal gasket according to the present invention. In this metal gasket, the bead 3 for sealing includes one of the gasket surfaces being convex with the other being concave and is formed around the periphery of the holes 2 bored in the elastic metal plate 1. The bead 3 comprises independent beads 9 in regions C other than the region between the holes 2, junction beads 4 in regions J at which the independent beads 9 adjacent to one another join with one another, and one common bead 5 in a region S between the holes 2.

FIG. 2 shows the shape of the bead 3 at the portion between the two adjacent holes 2 in the metal gasket, and dotted lines extending along each hole 2 represent inner and outer borders 8 and 11 that represent a bead width of the bead 3. The common bead 5 is formed into a straight shape having substantially the same width. Each independent bead 9 has substantailly the same bead width as that of the common bead 5, and is shaped into an arc extending along the hole 2. Further, in the region J of the junction beads 4, this bead comprises a smooth arc having a smaller radius of curvature than that of the independent bead 9 and connecting the common bead 5 to the independent bead 9, is shaped into an expanding shape in such a manner that the bead width thereof becomes progressively greater from the common bead 5 toward the single bead 9 and is separated into two independent beads 9 having the same bead width.

In this metal gasket, the bead width $L_1$ of the independent bead 9, the bead width $L_2$ of the other adjacent bead 9 and the bead width $L_3$ of the common bead 5 are substantailly the same. The bead width $L_4$ of the junction bead 4, at which the independent bead 9 and the common bead 5 join with each other, becomes progressively greater from the common bead 5 toward the independent bead 9. In other words, the bead width becomes progressively smaller from the two independent beads 9 toward one common bead 5.

Figure 3:
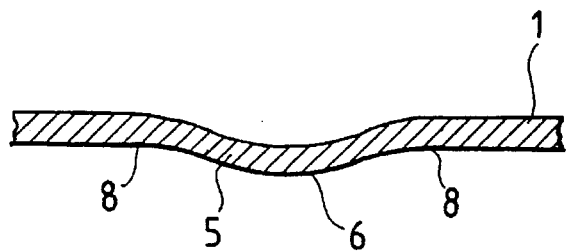
FIG. 3 is a sectional view taken along a line III—III in FIG. 2.

The sectional shape of the common bead 5 in the section along a line III—III in FIG. 2 in this metal gasket is shown in FIG. 3. The independent bead 9, too, has the same sectional shape. Turning back to FIG. 2, a two-dot-chain line represents the center line 6 of each bead 5. The center line 6 of one independent bead 9 and the center line 6 of adjacent independent bead 9 are shaped into an arc, that is, into a rounded shape, at the junction bead 4, are connected also to the center line 6 of the common bead 5 at this junction point 10. The junction point 10 of the center lines 6 is positioned at the junction 4. The length of the perpendiculars drawn from the center lines 6 to the bead border lines on both inside and outside, that is, to the inner and outer borders 8 and 11, is substantially the same except at the portion in the vicinity of the junction point 10, and the length of this perpendicular becomes progressively greater in the vicinity of the junction point 10 and reaches the maximum at the junction point 10.

The junction bead 4 is defined by the arcuate outer border 15 connecting the outer border 11 of the independent bead 9 to the outer border 11 of the adjacent independent bead 9 with a smooth curve (that is, in an arc or a round-shape), by one of the arcuate inner borders 16 connecting the inner border 8 of the independent bead 9 to one of the inner borders 8 of the common head 5 with an arcuate smooth curve having a radius of curvature smaller than the radius of curvature of the hole 2, and by the other of the arcuate inner borders 16 connecting the inner border 8 of the adjacent independent bead 9 to ther other of the inner borders 8 of the common bead 5 with an arcuate smooth curve having a radius of curvature smaller than the radius of curvature of the hole 2.

Next, a spring constant of the metal gasket according to the present invention shown in FIG. 2 will be compared with that of the conventional metal gasket. The spring constant shown in FIG. 12 is the result when the common bead 5 is cut out from this metal gasket and is measured. In the diagram, a sample A represents the spring constant of the conventional metal gasket shown in FIG. 11, a sample B represents the spring constant of the conventional metal gasket shown in FIG. 10, and a sample C represents the spring constant of the metal gasket shown in FIG. 2, each with respect to a load. As can be understood from FIG. 12, when the actual measured values of the spring constants in the whole shape are measured, the sample C exists between the sample A and the sample B but no significant difference can be observed.

However, when the spring constants in the narrow region J of the junction bead 4 of the bead 3, that is, when ¼ of the common bead 5 (the portion corresponding to the graph of FIG. 2) inclusive of the junction bead 4, is analyzed and calculated by a finite element method FEM within the range of an elastic limit, it is found out that differences exist between the analytical values of the spring constants of these metal gaskets. The spring constants are $3.146 \times 10^3$ kgf/mm for the sample A, $1.517 \times 10$ kgf/mm for the sample B and $1.582 \times 10^3$ kgf/mm for the sample C. The spring constant of the sample C is somewhat greater than that of the sample B and is remarkably smaller than that of the sample A. When the spring constant of only the junction bead 4 is measured within a practical range of 100 to 150 μm, for example, the spring constant of the sample A is high, the spring constant of the sample B is low, and the spring constant of the sample C exists between the former two. In this way, these actual measured values exhibit a similar tendency to the calculated values by the analysis of the finite element method FEM.

Figure 10:
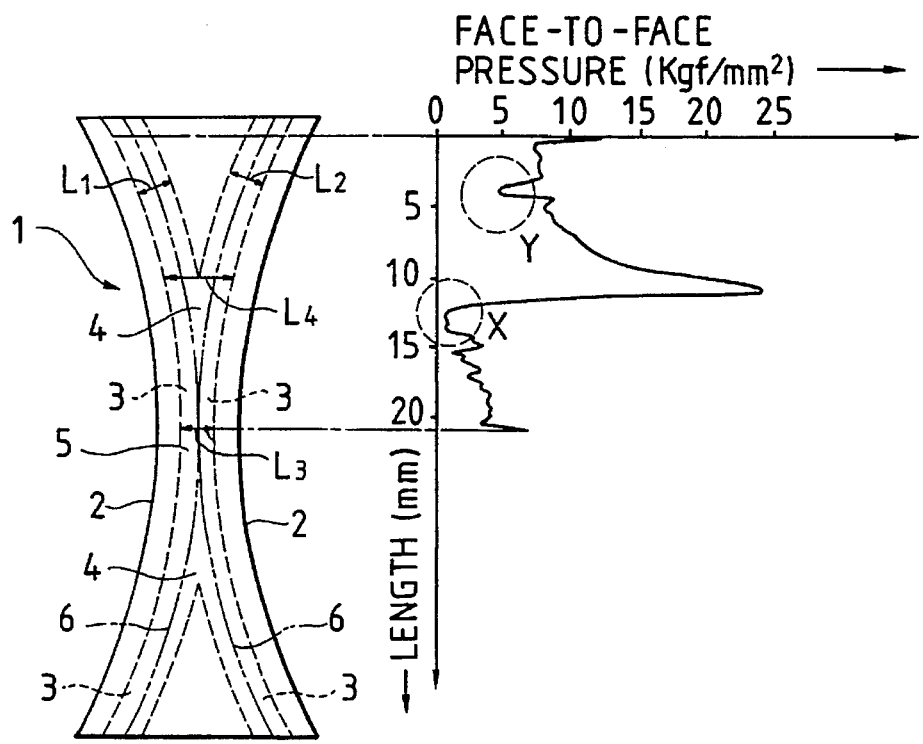
FIG. 10 is an enlarged explanatory view showing an example of a junction of a conventional metal gasket.
Figure 11:
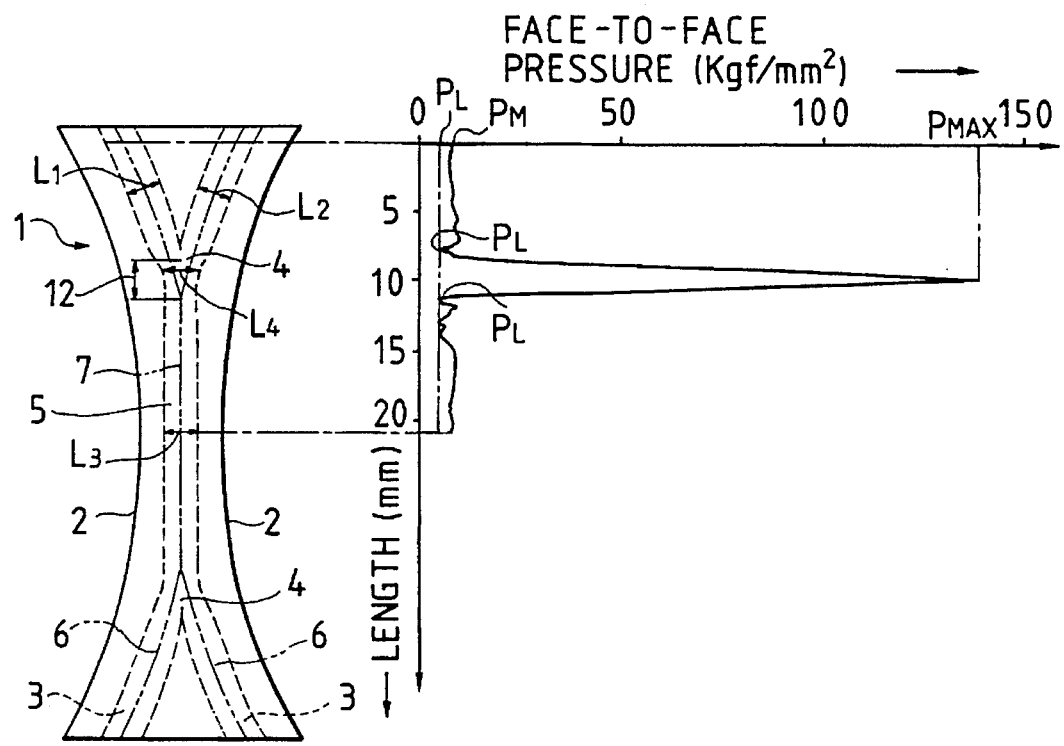
FIG. 11 is an enlarged explanatory view showing another example of the junction of the conventional metal gasket.
Figure 12:
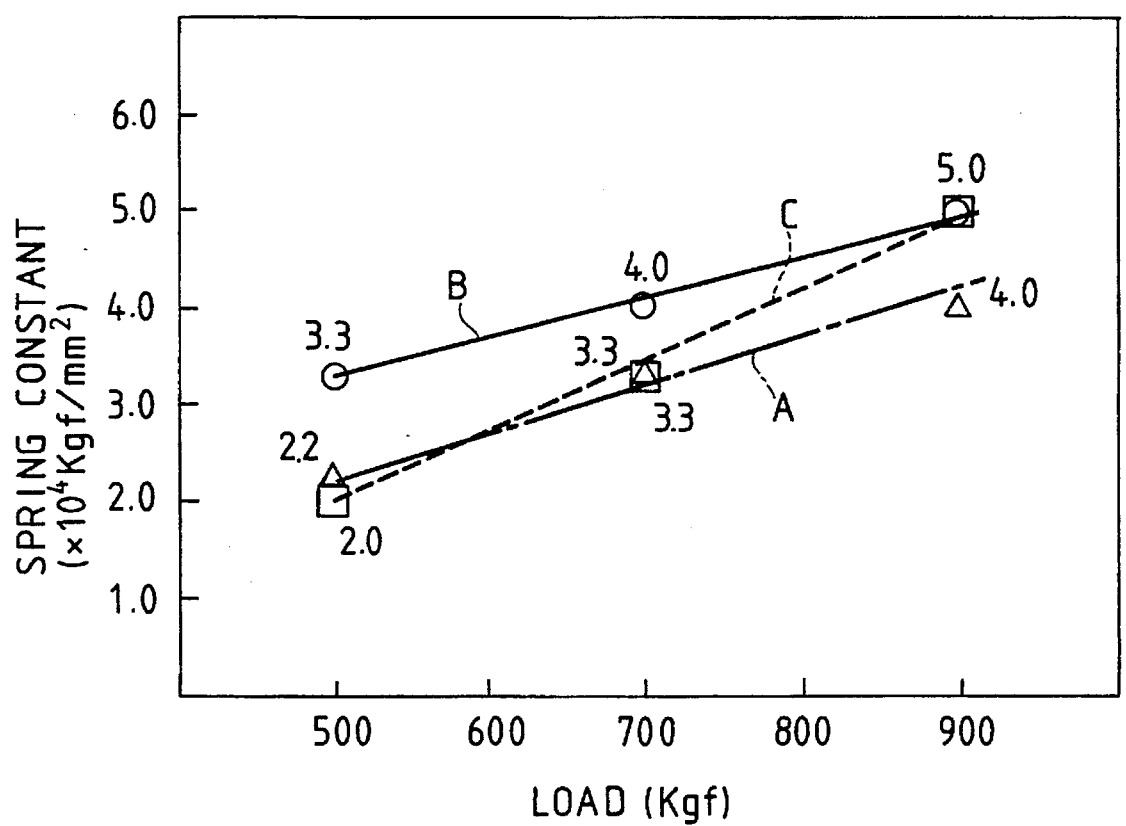
FIG. 12 is a comparision graph showing the result of measurement of a spring constant of each metal gasket shown in FIGS. 10 and 11.

Next, the face-to-face pressures of the bead, that is, the reaction occurring when the metal gasket is clamped and fitted under the compressed state between the cylinder block and the cylinder head, will be compared between the metal gasket of the present invention shown in FIG. 2 and the conventional metal gaskets shown in FIGS. 10 and 11. The peak value of the face-to-face pressure observed at the junction bead 4 becomes considerably smaller than that shown in FIG. 11 and becomes somewhat smaller than that shown in FIG. 10. When the drop of the face-to-face pressure that occurs across the junction bead 4 is examined, the drop of the face-to-face pressure does not occur on the side of the independent bead 9 as well as on the side of the adjacent independent bead 9 in the metal gasket of the present invention shown in FIG. 2. The drop of the face-to-face pressure on the side of the side of the common bead 5, too, is considerably smaller than that in the metal gasket shown in FIG. 11. In other words, it can be understood that the face-to-face pressure of the metal gasket of the present invention shown in FIG. 2 is much more uniform than in the conventional metal gaskets.

Figure 4:
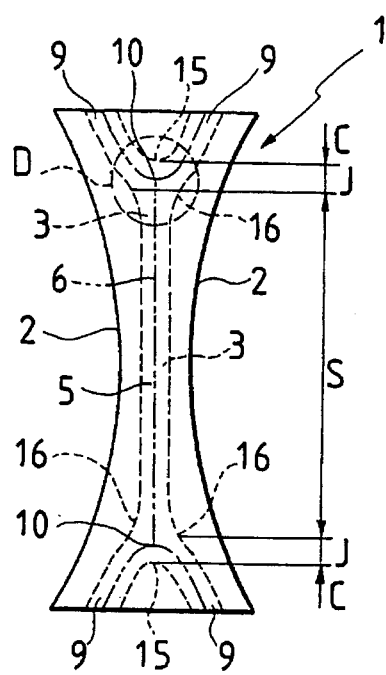
FIG. 4 is an enlarged explanatory view showing another example of the bead between the bore holes of the metal gasket.
Figure 5:
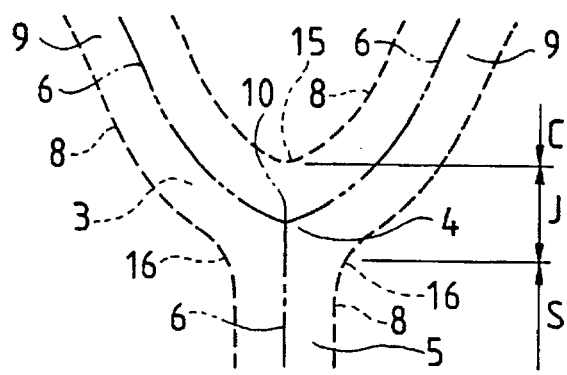
FIG. 5 is an enlarged explanatory view of a junction indicated by symbol D in FIG. 4.

FIG. 4 is an enlarged view showing the portion between the holes of the metal gasket according to another embodiment of the present invention, and FIG. 5 is an enlarged view of the principal portion of the junction of the metal gasket shown in FIG. 4. The center lines 6 of the independent bead 9 and of the common bead 5 indicated by two-dot-chain line join with one another at the junction point 10 with an angle of 120°. Since all the adjacent pairs of center lines 6 have the angle of 120° between them, the face-to-face pressure can be uniformed much more than in the metal gasket shown in FIG. 2.

Figure 6:
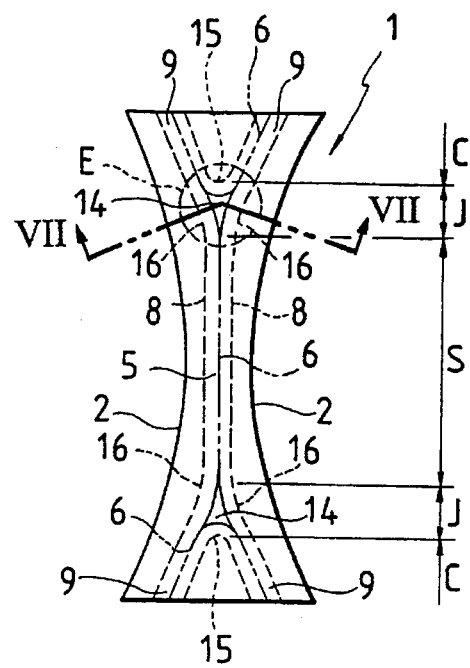
FIG. 6 is an enlarged explanatory view showing still another example of the bead between the bore holes of the metal gasket.
Figure 7:
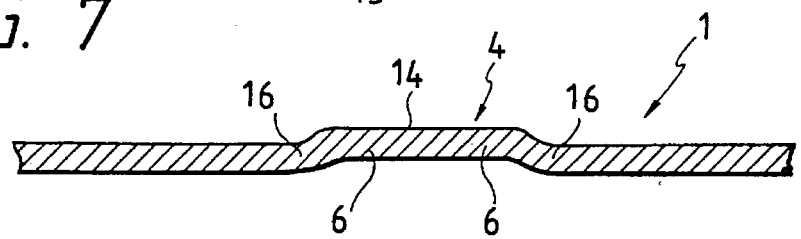
FIG. 7 is an enlarged sectional view of a junction taken along a line VII—VII of FIG. 6.

FIG. 6 is an enlarged view showing the portion between the holes of the metal gasket according to still another embodiment of the present invention. The center line 6 of the independent bead 9 connects with that of another independent bead 9 adjacent to the former while describing an arc at the junction 4. Similarly, the center line 6 of the independent bead 9 and the center line 6 of the common bead 5, and the center line 6 of the adjacent independent bead 9 and the center line 6 of the common bead 5 connect with one another while describing arcs, respectively. Accordingly, a flat surface 14 encompassed by the three arcuate borders is defined at the junction bead 4. The VII—VII section inclusive of this flat surface 14 is shown in FIG. 7. This metal gasket is shaped in such a manner that the length of the perpendicular drawn from the center lines 6 to the width line 8 of the bead become substantially the same. This metal gasket, too, can restrict the peak of the face-to-face pressure at the junction bead 4 to a considerably low level in the same way as in each of the foregoing embodiments, and can also restrict the drop of the face-to-face pressure occurring at the borders on both sides of the junction bead 4. Accordingly, the face-to-face pressure can be made uniform near the junction bead.

Figure 8:
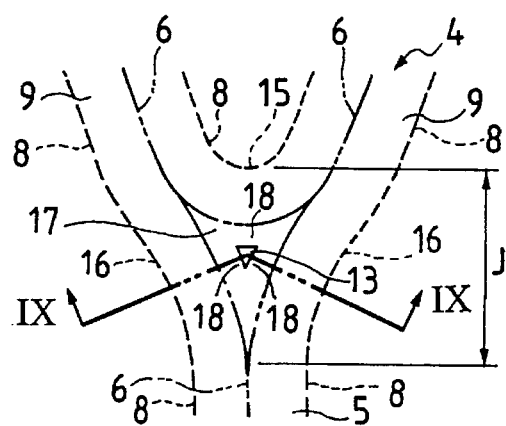
FIG. 8 is an enlarged explanatory view showing still another example of a junction indicated by symbol E in FIG. 6.
Figure 9:
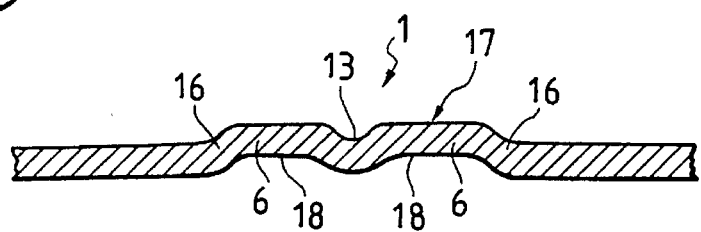
FIG. 9 is an enlarged sectional view of a junction taken along a line IX—IX in FIG. 8.

As shown especially in FIGS. 8 and 9, the metal gasket of this embodiment can be provided with a face-to-face pressure regulation recess 13 at the center of the junction portion 17 encompassed by the arcuate outer border 15, one of the arcuate inner borders 16 and the other arcuate inner border 16 in order to control the face-to-face pressure of the junction bead 4. This face-to-face pressure regulation recess 13 is shaped into a substantially triangular shape, one of the surfaces thereof is convex with the other being concave, and the height is smaller than the thickness of the bead 3. When the face-to-face regulation recess 13 is formed at the center of the flat surface 14, the bead of the junction bead 4 is shaped into the triangular bead comprising the bead portions 18 of the three sides, and the bead width of the triangular bead is shaped to a smaller width than the bead width of the independent bead 9 and that of the common bead 5. When the size of the face-to-face pressure regulation recess 13 is increased, the bead width of the junction bead 4 can be further reduced. When the depth of the face-to-face pressure regulation recess 13 is increased, the three bead portions 18 of the junction bead 4 describe an acute angle, and the face-to-face pressure becomes great. Accordingly, the face-to-face pressure of the junction bead 4 can be regulated to a suitable value by controlling the size and depth of the face-to-face pressure regulation recess 13. In this way, the peak face-to-face pressure at the junction bead 4 of the metal gasket shown in FIGS. 8 and 9 can be suitably reduced to a smaller value than that in the conventional metal gaskets, by forming the face-to-face pressure regulation recess 13 at the junction bead 4 in the metal gasket shown in FIGS. 8 and 9, and the face-to-face pressure of the independent bead 9 can be brought close to that of the common bead 5 without lowering drastically the face-to-face pressures at the boundary between the junction bead 4 and the independent bead 9 and at the boundary between the junction bead 4 and the common bead 5. In this way, seal performance of the metal gasket can be improved by controlling the face-to-face pressure uniformly around the whole periphery of a hole 2.

What is claimed is:

1. A metal gasket including:

an elastic metal plate;

adjacent cylinder bore holes in said metal plate;

beads formed around said cylinder bore holes by a deformation of said metal plate such that one surface of the metal plate is convex and the other surface of the metal plate is concave;

said beads further comprising:

independent bead parts formed in a region other than a region between said cylinder bore holes;

junction bead parts formed in a region where said independent bead parts merge with each other; and common bead parts connecting with said junction bead parts and disposed in a region between said cylinder bore holes;

wherein said independent bead parts each has a bead deformation first width, between inner borders and outer borders, extending along said cylinder bore holes, and said first width is substantially uniform around said cylinder bore holes;

said common bead parts having a bead deformation second width between said inner borders extending from one to another of said adjacent cylinder bore holes, and said common bead parts are straight;

said junction bead parts each encompassed by an arcuate smooth line connecting said outer borders of said independent bead parts, and by a smooth curve line connecting said independent bead parts and said common bead parts; and said bead width of said common bead parts and said bead width of said independent bead parts being equal.

2. A metal gasket according to claim 1, wherein the regions of said junction bead parts each is formed in such a way that the width thereof becomes progressively greater from said common bead part toward said independent bead part.

3. A metal gasket according to claim 1, wherein a triangular flat portion encompassed by the center lines of said junction bead parts is formed at said junction bead parts, and the length of the perpendiculars from said center lines to the border lines of said beads is substantially the same.

* * * * *